No. 31,097. PATENTED JAN. 8, 1861.
P. MILES.
MEAT CUTTER.
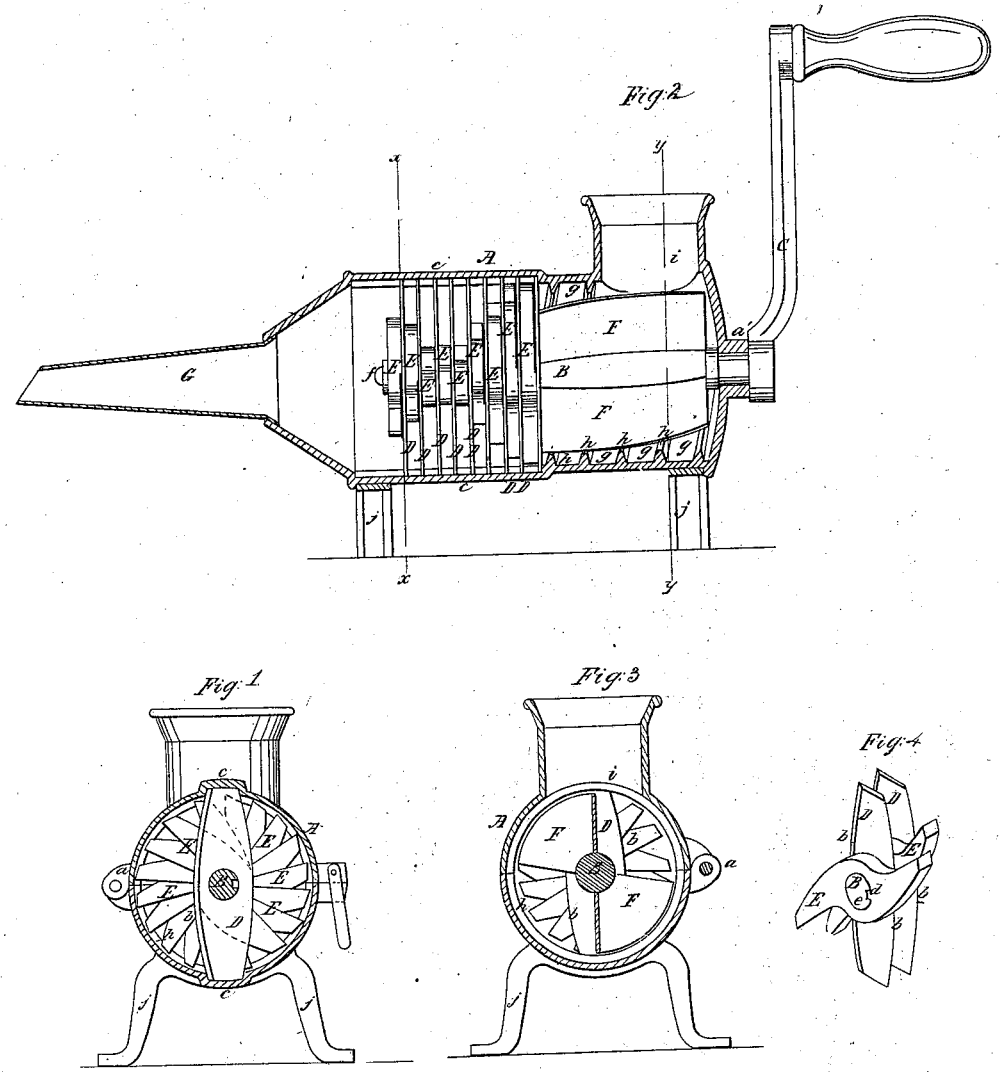
Inventor
Purchis Miles
per Munn & Co
Attorneys
Witnesses:

UNITED STATES PATENT OFFICE.

PURCHES MILES, OF NEW HAVEN, CONNECTICUT, ASSIGNOR TO PLANT'S MANF. CO., OF SOUTHINGTON, CONNECTICUT.

MEAT-CUTTER.

Specification of Letters Patent No. 31,097, dated January 8, 1861.

*To all whom it may concern:*

Be it known that I, PURCHES MILES, of New Haven, in the county of New Haven and State of Connecticut, have invented a new and Improved Implement or Device for Cutting Meat for Sausages and other Purposes; and I do hereby declare that the following is a full, clear, and exact description of the same, reference being had to the annexed drawings, making a part of this specification, in which—

Figure 1, is a transverse vertical section of my invention taken in the line $x$, $x$, Fig. 2. Fig. 2, a longitudinal central section of the same. Fig. 3, a transverse vertical section of the same taken in the line $y$, $y$, Fig. 2. Fig. 4, a detached perspective view of a portion of the cutting device of the same.

Similar letters of reference indicate corresponding parts in the several figures.

To enable those skilled in the art to fully understand and construct my invention I will proceed to describe it.

A represents a cylindrical shell which is divided into two equal longitudinal parts connected by hinges $a$, $a$, and B, is a shaft which is fitted longitudinally in the shell A, and has its bearing $a'$, in one end of it the outer end of the shaft being provided with a crank C. The shaft B, does not extend entirely through the shell A, and its inner end is supported by a series of cutters D, which are formed of steel plates having slightly rounded cutting edges $b$, $b$, at each side. The upper and lower ends of these cutters D, are fitted in recesses $c$, $c$, in the shell A, and are thereby kept stationary in an upright position while the shaft B, rotates as will be fully understood by referring to Fig. 1.

Any proper number of cutters D, may be used and between them beaters E, are placed. These beaters are of slightly curved form as shown clearly in Fig. 4, and they are fitted on the shaft B, and made to rotate with it by feathers $d$, which are fitted in a groove $e$, in the shaft, see Fig. 4. The cutters and beaters are placed alternately on the shaft and the beaters have a spiral position thereon. The cutters and beaters are secured on the shaft B, by a screw $f$, which is fitted in the end of the shaft B.

On the shaft B, adjoining the cutters and beaters E, there are two spiral flanches F, F, and the portion of the interior of the shell A, which encompasses the flanches F, F, is provided with spiral grooves $g$, as shown clearly in Fig. 2, the edges of the flanches F, just clearing the ledges $h$, which form the grooves. The shell A, is provided with an opening $i$ through which the meat is passed into the shell at a point over the spiral flanches F, F, and the discharge end of the shell is of conical form, with a tube or spout G, fitted therein when necessary. The shell A may have feet $j$, cast with it to retain the implement at a suitable height.

The operation is as follows: The shaft B, is turned by hand or other convenient power and the meat is fed into the shell through the opening $i$. The flanches F, F, force the meat through the grooves $g$, and feed it to the cutters D, and the beaters E present the meat to the cutters which is thereby minced or cut of the required degree of fineness. The beaters E, work in close contact with the cutters D, and cause the cutting to be done in a manner similar to that performed by shears, the meat being minced or cut by clean cuts and not torn and rendered stringy as by the ordinary cutters. In case of any play or looseness between the cutters and beaters it may be obviated at once by screwing up screw $f$.

In cutting meat for sausages the tube or spout G, is fitted to the shell, and the case to receive the cut meat fitted on the spout G. The meat being forced into the case during the operation of cutting.

By having the inner end of the shaft supported by the cutters as hereinbefore described the shaft is entirely prevented from bending or yielding throughout its whole length and thus the beaters are always made to fit closely up against the knives and good work is insured. Another advantage which attends the supporting of the shaft upon the cutters is that a collecting chamber or unoccupied space is formed in the case at the inner end of the driving shaft and in front of the discharge end of the case into which chamber the cut meat is collected after it passes the knives and the discharge of the meat into the tube G or from the machine is not impeded.

Having thus described my invention, what I claim as new and desire to secure by Letters Patent, is—

The combination of the rotary spiral forcing flanches F and grooves $h$ with the revolving beaters E and stationary cutters D in the manner and for the purposes herein shown and described.

PURCHES MILES.

Witnesses:
A. B. JACOCKS,
BENJ. E. BEECHER.